UNITED STATES PATENT OFFICE.

SIMON H. KENNEDY, OF JOHNSTOWN, NEW YORK.

IMPROVEMENT IN MEDICAL EXTRACTS FROM HEMLOCK BARK.

Specification forming part of Letters Patent No. 121,631, dated December 5, 1871.

*To all whom it may concern:*

Be it known that I, SIMON H. KENNEDY, of Johnstown, in the county of Fulton and State of New York, have invented a new and useful remedial agent for various diseases; and I do hereby declare that the following is a full and exact description thereof.

The object of my invention is to extract by an improved process, from barks containing tannin, a cheap remedial agent for different diseases to which mankind is subject; and from experience I find that hemlock bark answers the object of my invention the best, as it contains more of the tannic acid than the oak.

From long experience my invention has proved an efficacious remedy in chronic diarrhea and dysentery and uterine and other passive hemorrhages; also, as an injection for leucorrhea, catarrh, and all chronic diseases of the mucous surfaces. It is also very efficacious when used as a local application in hemorrhoids and leucorrhea. It is likewise one of the best of known remedies in the treatment of diseases of the throat and lungs when converted into a spray by means of a steam-atomizer.

My invention or discovery consists in distilling by an improved process, as an article of manufacture, from hemlock or oak barks, a sirup that may be prescribed and used with the most beneficial effects in any of the above-named diseases.

I will now proceed to describe my process of distillation. I take the bark from the trees in the month of May or June, and dry it without allowing the fiber to be exposed either to the sun or dew, setting it up on the same day that it is cut. After being thoroughly dried—say in two weeks—I pile it, after which I grind it finer than for ordinary purposes. The object of grinding it fine is to admit of its being leached at a low temperature. I then leach with pure distilled water at a temperature not exceeding 150° Fahrenheit. When leached at this comparatively low temperature the virtues of the bark are retained and an extract is obtained which is soluble in cold water. This result could not be obtained if the bark were put under a high temperature in the process of leaching, and is necessary when the extract is to be used for medicinal purposes. The fluid thus obtained is made to flow over an extended heated surface, so as to reduce it to about 80° by the barkometer, into a tank, within which it is allowed to stand for a suitable length of time, and while within this tank all impurities settle to the bottom, so that the fluid may be removed therefrom perfectly pure. This pure fluid is then evaporated in vacuo at a heat not exceeding 120° Fahrenheit, until it is reduced to about 250° by the barkometer, when it is ready for use.

I am aware that tannin from different barks has been extracted for the purpose of transportation and for tanning purposes, and have myself been engaged in this business; but the tannin thus extracted is crude and impure, and does not in any way answer the purposes of my invention, and my present process, as above described, is a great improvement over any other hitherto known or used.

Having thus described my invention, what I claim, and desire to secure by Letters Patent of the United States, is—

As an article of manufacture for medicinal purposes, a fluid extract obtained from hemlock bark and other barks containing a large percentage of tannin, by the process substantially as herein described.

SIMON H. KENNEDY.

Witnesses:
CHARLES ROGERS,
JOHN S. THORNTON.

(98)